No. 774,827. PATENTED NOV. 15, 1904.
P. BUTLER.
MACHINE FOR PRIMING CARTRIDGE SHELLS.
APPLICATION FILED JAN. 30, 1899.
NO MODEL. 6 SHEETS—SHEET 1.

Fig. 1.

Witnesses:
Nancy T. Ford
J. Maloney

Inventor
Paul Butler
By J. P. and S. F. Livermore
Attys

No. 774,827. PATENTED NOV. 15, 1904.
P. BUTLER.
MACHINE FOR PRIMING CARTRIDGE SHELLS.
APPLICATION FILED JAN. 30, 1899.
NO MODEL. 6 SHEETS—SHEET 2.

No. 774,827. PATENTED NOV. 15, 1904.
P. BUTLER.
MACHINE FOR PRIMING CARTRIDGE SHELLS.
APPLICATION FILED JAN. 30, 1899.
NO MODEL. 6 SHEETS—SHEET 4.

Witnesses.
Nancy P. Ford.
Jas. J. Maloney.

Inventor.
Paul Butler.
by J. P. and J. J. Livermore
attys.

No. 774,827. PATENTED NOV. 15, 1904.
P. BUTLER.
MACHINE FOR PRIMING CARTRIDGE SHELLS.
APPLICATION FILED JAN. 30, 1899.
NO MODEL. 6 SHEETS—SHEET 6.

Fig. 16.

No. 774,827. Patented November 15, 1904.

UNITED STATES PATENT OFFICE.

PAUL BUTLER, OF LOWELL, MASSACHUSETTS.

MACHINE FOR PRIMING CARTRIDGE-SHELLS.

SPECIFICATION forming part of Letters Patent No. 774,827, dated November 15, 1904.

Application filed January 30, 1899. Serial No. 703,883. (No model.)

*To all whom it may concern:*

Be it known that I, PAUL BUTLER, of Lowell, county of Middlesex, and State of Massachusetts, have invented an Improvement in Machines for Priming Cartridge-Shells, of which the following description, in connection with the accompanying drawings, is a specification, like letters on the drawings representing like parts.

The present invention relates to a machine for priming shells—that is to say, inserting the primers or caps into the primer-seats which are formed in the shells.

The machine embodying the invention is provided with a suitable tool to act upon the primer and insert the same into the primer-seat and in conjunction with the said tool is provided with automatic feeding devices for successively bringing a shell and a primer into such a position that the tool in operating will force the primer into the primer-seat.

The shell-feeding device and the primer-feeding device are each arranged to be automatically supplied, respectively, with shells and primers, the said shells and primers being placed in suitable hoppers, and the supplying devices as a whole are so arranged that both the shells and the primers will be uniformly and properly positioned prior to the final feeding operation.

During the operation of the primer-inserting tool the shell is arranged to be supported upon a suitable anvil, and for convenience in the operation of supplying the shells a reciprocating anvil is utilized and arranged to move into engagement with the shell as the primer-inserting tool moves into engagement with the primer, the said anvil then being withdrawn from the shell as the tool recedes, so as to permit a movement of the feeding device to present another shell to the tool.

The feeding devices and the reciprocating tool and anvil are provided with connecting mechanism whereby they are caused to properly coöperate, and in order to stop the machine in case the supply of shells or primers in the respective hoppers becomes exhausted or for any reason the feeding devices fail to operate properly the machine is provided with an emergency stop depending for its operation on the presence or absence of the shells or primers in their proper places. The emergency stop, which may be a clutch or belt throw-off, has an actuating device or "stop-actuator," as it will be termed, coöperating with feelers adapted to respectively engage a shell in the shell-feeding device or a primer properly positioned with relation to the primer-feeding device, the said feelers when they thus engage a shell or primer being prevented from coöperating with the stop-actuator. These feelers may both be arranged to move toward the feeding devices at each operation of the tool, but adapted to be arrested in such forward movement by a shell or primer properly positioned, and if they fail to find a primer or a shell will not be arrested, but will continue their movement and act on the stop-actuator to immediately stop the machine.

A further feature of the invention consists in the combination, with the primer-setting tool, of a punch and a finishing-tool, so that a shell can be supplied to the machine with the primer-seat formed therein, but not punched, the said shell being punched, primed, and finished at a single operation. This is accomplished by supplying the machine with a gang of tools comprising a punch, the primer-setting tool, and a finishing-tool, all of which may be arranged to operate simultaneously, so that at each cycle three shells are operated upon, one being punched, another having a primer inserted therein, and a third finished. Prior to the next operation of the tools the feed takes place, and the shell which has been punched is advanced to the inserting-tool, the shell in which a primer has been inserted is advanced to the finishing-tool, and a shell which has not been acted upon at all is advanced to the punch, the finished shell being advanced toward a delivery-chute and finally delivered from the machine. The punch and finishing-tools have corresponding anvils to support the shells during the operation, and the said anvils reciprocate with the anvil heretofore described in conjunction with the inserting-tool. The punch as it reciprocates enters the primer-seat of a shell and passes through the base of said seat, thus making the opening into the interior of the shell for the igniting-spark of the primer. In the punching operation there may be a slight bur formed along the edge of the punched opening which should be flattened, and, further than this, it is desirable that the whole lower surface of the primer-seat should be flattened to afford a firm support for the primer. To this end the finishing-tool comprises a plunger having a suitably-shaped face arranged to engage the primer and the flanged end of the shell and press the latter down toward the anvil, which coöperates with said finishing-tool and which engages the inner surface of the primer-recess, which is thus flattened and brought to exactly the right distance from the head of the shell. The same operation insures the complete setting of the primer with the surface thereof flush with the surface of the flanged end or head of the shell or slightly below the same.

The invention further consists in certain novel details of construction and arrangement of the several instrumentalities adapted to perform the various operations of the machine, and such novel details will be hereinafter more fully described.

Figures 6, 14, 15:
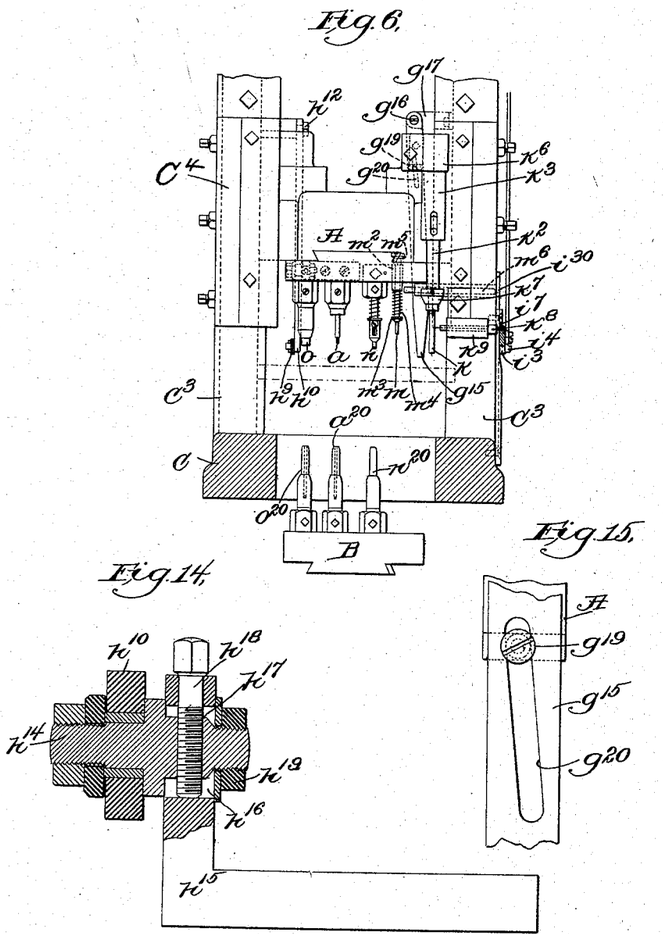
Fig. 6 is a detail showing the arrangement of the tools, anvils, and feelers which control the emergency stop.
Figs. 14 and 15 are details, on an enlarged scale, of portions of the primer-feeding mechanism.
Figure 8:
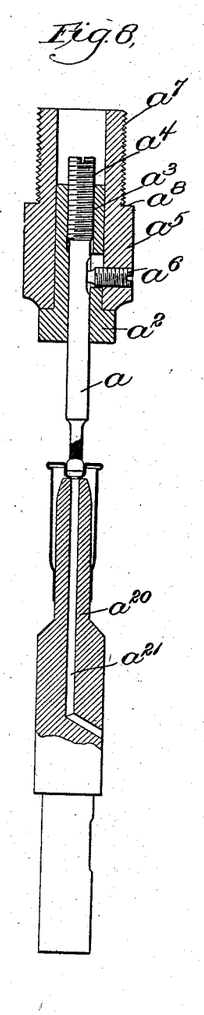
Figure 9:
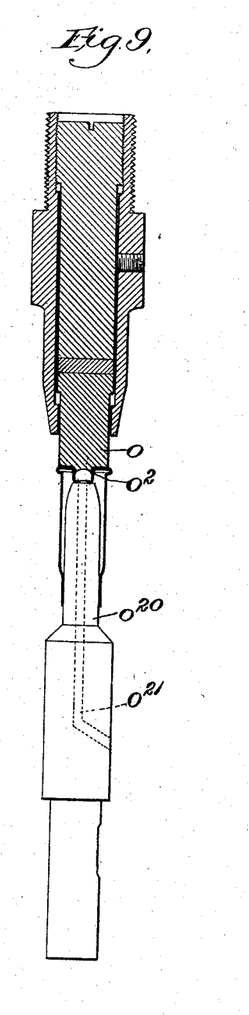
Figure 16:
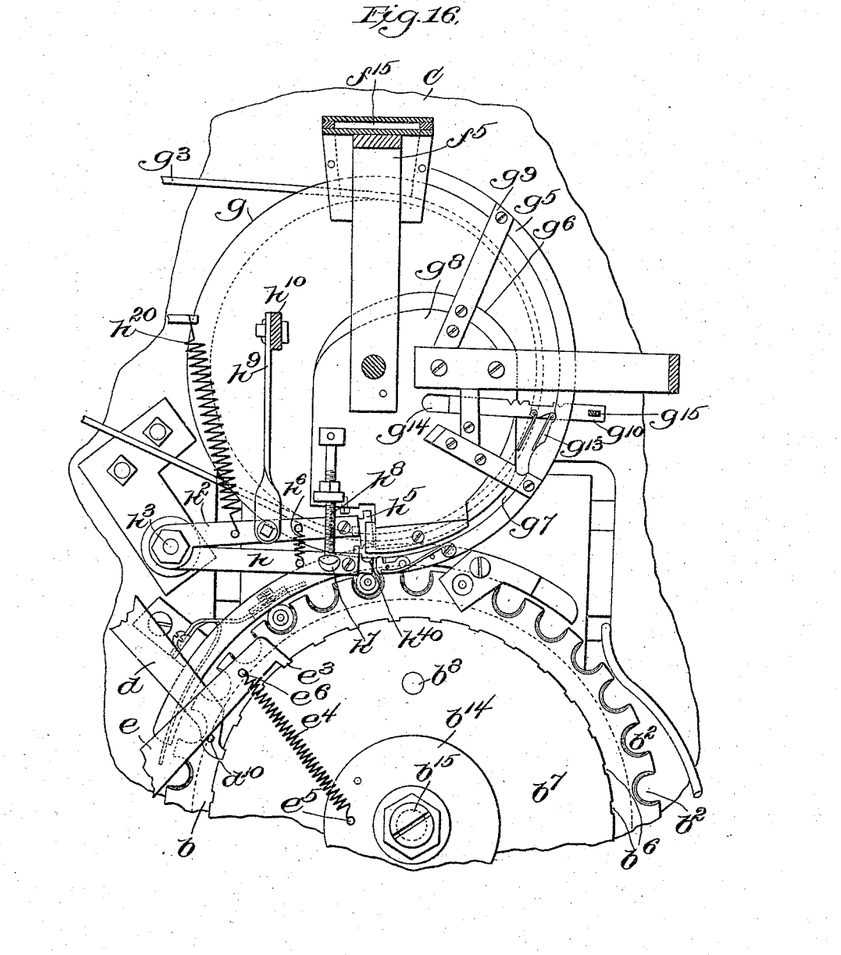
Fig. 16 is a view, mainly in plan, of a portion of the machine, showing on an enlarged scale the primer-transferring mechanism.

The primer-inserting tool $a$, Figs. 6 and 8, comprises a reciprocating finger, shown as mounted on a tool holder or carrier A and adapted to move toward and from a shell engaged and supported by an anvil $a^{20}$. The shell is so presented to the primer-inserting device that the latter will move toward the primer-seat formed in the head of the shell and will act upon a primer presented thereto by a suitable primer-feeding device and will engage said primer and force the same into the primer-seat.

As herein shown, the tool-carrier A is connected by an adjustable pitman $A^2$ with a wrist-pin $A^3$ on a crank projecting from the main shaft $A^4$ of the machine, which shaft is shown as provided with a driving-pulley $A^5$. The shaft $A^4$ is shown as having suitable bearings in the upper portion of the frame of the machine, the said frame comprising a base-plate C, supported upon a suitable stand $C^2$ and having uprights $C^3$ projecting upward from the base to support the shaft. The tool-carrier A is supported in guides $C^4$, Fig. 6, which are formed in the uprights $C^3$.

Figures 2, 10, 11, 12, 13:
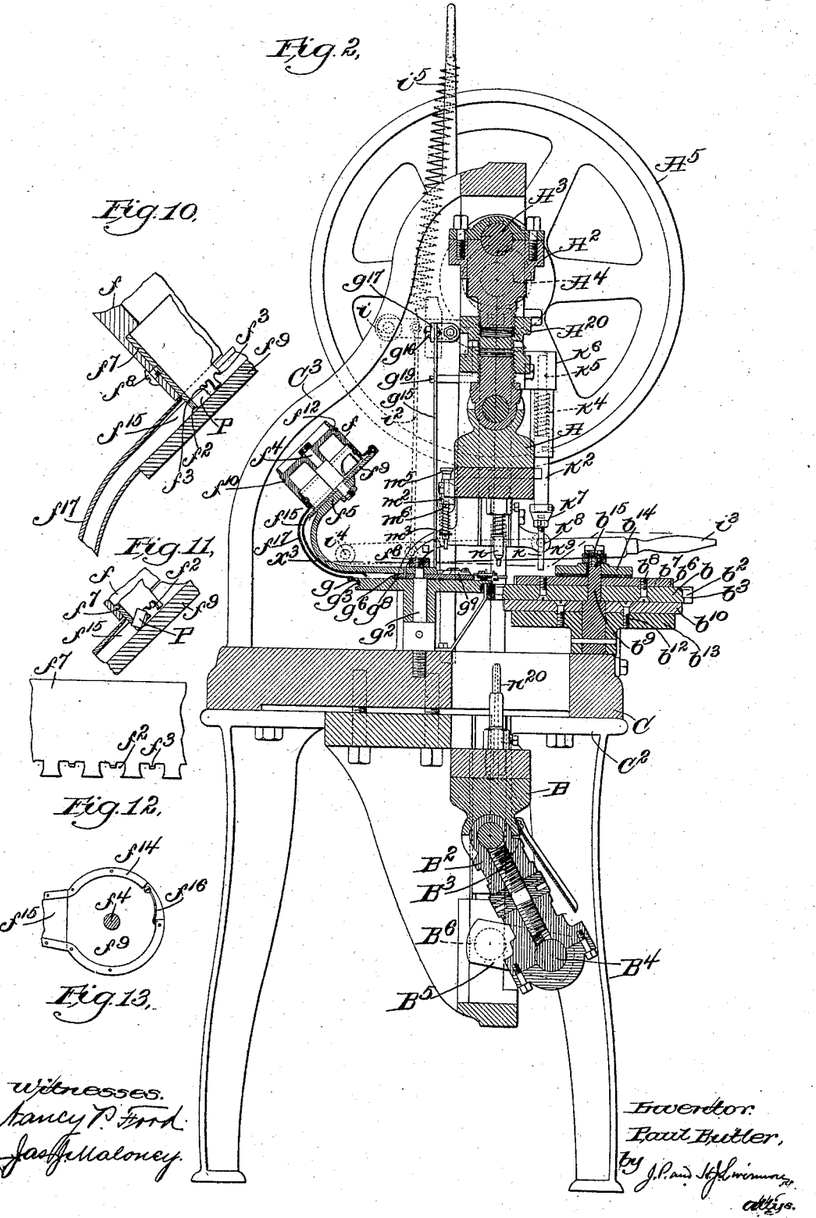
Fig. 2 is a vertical section of the same, taken on the line $x^2$ of Fig. 3.
Figs. 10, 11, 12, and 13 are details illustrating the means for supplying the primers in uniform position to the primer-feeding devices.

The finger $a$, which constitutes the primer-inserting device, is shown as adjustably secured in a block or socket-piece $a^2$, having an internal screw-thread $a^3$ coöperating with an external screw-thread $a^4$, the said block being arranged to be secured after the proper adjustment is attained in a supplemental socket-piece $a^5$ by means of a set-screw $a^6$. The said socket-piece $a^5$ has a screw-thread $a^7$, terminating in a shoulder $a^8$, whereby the socket-piece itself is secured in a suitable threaded opening in the tool-carrier A. As further means for adjusting the throw of the tool $a$ (or such other tools as may be employed) the pitman $A^2$ is arranged to be lengthened and shortened, the said pitman having two members, each provided with a screw-thread, as shown in Fig. 2, the said screw-threads being cut in opposite directions and entering correspondingly-threaded sockets in an adjusting-nut $A^{20}$.

Figure 7:
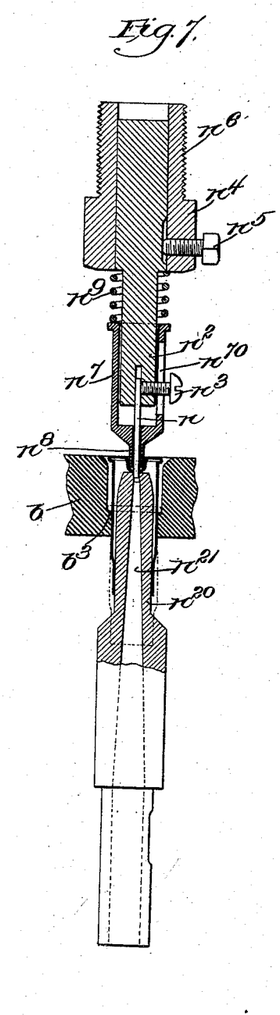
Figs. 7, 8, and 9 are enlarged sectional details showing the various tools and illustrating the mode of operation thereof, the said figures being arranged to show the operations which successively take place on the same shell and being reversed in position from that shown in the other drawings, which also illustrate other elements of the machine.

In the operation of the machine the shells must be successively advanced to the inserting-tool, the machine being provided for this purpose with a step-by-step feeding device, herein shown as a rotatable carrier $b$, arranged to receive the shells from a hopper $c$, the said carrier being advanced after each operation of the tool, so as to present a new shell in position to be acted upon and dwelling during the operation. The primer-feeding device, which will be hereinafter described, is arranged to operate at the same time and to present a primer to the primer-seat, so that the same can be engaged by the inserting-tool and forced into place. The feeding device or shell-carrier $b$ is herein shown as a rotatable disk having a series of peripheral recesses $b^2$, each arranged to receive a shell from a tube $c^2$, extending downward from the hopper $c$. Each recess is provided with a supporting-shoulder $b^3$, Figs. 2 and 7, adapted to sustain the flange of an inverted shell, (see dotted lines, Fig. 7,) the mouth of the recess being contracted to a diameter less than that of the said flange, but equal to or greater than that of the body of the shell. The tube $c^2$ is of such size as to contain a single column of shells supported endwise therein, and the recesses $b^2$ travel along below the end of said tube, so that a shell will drop into each recess as it passes. It is obvious that if a shell should drop into the recess open end up the flange would rest upon the shoulder $b^3$ and the body of the shell project upward above the surface of the carrier. To invert a shell which is in this position so that all the shells may be uniformly arranged flange end up before being presented to the tool, the feeding device is provided with a deflector $b^4$, extending diagonally across the recesses above the carrier and arranged to engage the upwardly-projecting body of the shell and tip the same over as the carrier advances, the carrier rotating in such direction that the recesses travel from the chute $c^2$ toward the deflector. The inclination of the deflector $b^4$ is such as to force the open end of the shell laterally toward the edge of the carrier, the recess in which holds the flanged end of the shell so that the shell is tipped over (the body passing through the lateral opening) and eventually rests open end down upon the shoulder $b^3$, which supports the flange. To prevent the shell from tipping too suddenly, there is a guard $b^5$, upon which the body of the shell falls when first tipped by the deflector, dropping completely after passing the said guard, so that the body portion projects downward, while the flange rests on the shoulder $b^3$. Since the lateral opening of the recess is of sufficient size to permit the body to pass through, but is smaller than the flange, it is obvious that the shell can turn completely over, but cannot fall out of the recess unless the flange is lifted vertically from the recess. If a shell comes down the chute open end down, it will drop through the recess until the flange reaches the shoulder $b^3$ and will not be operated upon by the deflector $b^4$, the said shell being already in the desired position. In the travel of the carrier $b$ past the tube $c^2$, therefore, each recess receives a shell, which is ready to be acted upon as soon as it is advanced to the position where the tool operates.

In order to insure that the tube $c^2$ will be continually supplied with shells, the hopper $c$ is shown as provided with an agitating device comprising a sleeve $c^3$, projecting into the hopper, and a finger $c^4$, also passing into the same, the said sleeve and finger having a projection $c^5$, arranged to be operated by a lever $c^6$, on which is a cam-roll $c^8$, to be engaged by a cam $c^9$ (dotted lines, Fig. 1,) on the shaft $A^4$. In the rotation of the shaft, therefore, the said lever is oscillated or swung on its pivot $c^7$, thus producing an up-and-down movement of the agitating-tube and finger and guiding the shells into the said tube.

The step-by-step feed movement of the carrier $b$ is produced through the agency of a pawl $d$, connected with a reciprocating slide $d^2$ and arranged to engage teeth or notches $b^6$, suitably formed in the edge of a disk connected with the carrier $b$. As herein shown, the said notches are formed along the edge of a disk $b^7$, secured to the main portion of the carrier $b$ by screws $b^8$. As indicated in Fig. 2, the carrier as a whole has a bearing upon a spindle $b^9$, below which a disk $b^{10}$ is secured, as by screws $b^{12}$, to a support $b^{13}$, secured to the base C of the frame. The disk $b$ has a frictional bearing upon the face of the disk $b^{10}$ and is secured in position by means of a retaining member $b^{14}$, shown as provided with a friction-washer, said retaining member being secured to the spindle $b^9$, as by a screw $b^{15}$. While, therefore, the disk is free to rotate, considerable frictional resistance is encountered in such rotation, so that there is no danger of overthrowing in the feeding operation.

Figure 1:
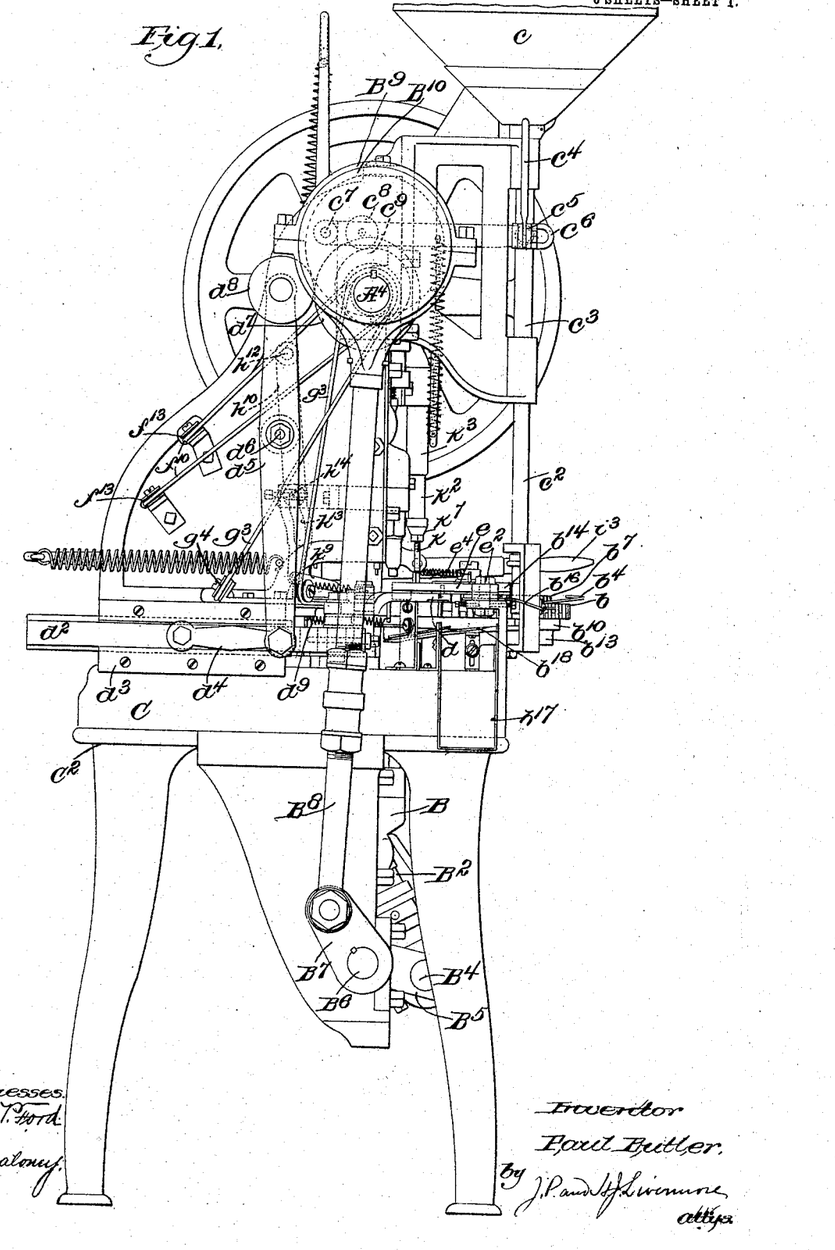
Figure 1 is a side elevation of a machine embodying the invention.

The slide $d^2$, which actuates the pawl $d$, is shown as mounted in a suitable guide $d^3$, Fig. 1, secured to the base-plate C, and is connected by a link $d^4$ with a lever $d^5$, pivoted at $d^6$ and arranged to be operated by a cam $d^7$ upon the shaft $A^4$. The said lever is shown as provided with a cam-roll $d^8$. As the slide $d^2$ reciprocates the pawl $d$ moves out of engagement with one of the notches $b^6$ and travels along the edge of the disk $b^7$ until it drops into another notch $b^6$ through the agency of its spring $d^9$, which holds it against the edge of said disk. The movement in the opposite direction obviously causes the carrier $b$ to travel the distance between two notches, said notches being arranged to correspond to the recesses in the carrier, so that a shell in a recess behind the one which has been operated upon is presented to the tool.

The cam $d^7$ or equivalent operating device is so arranged that at the end of each feed movement the carrier dwells stationary long enough for the proper operation of the tool prior to the next feed movement. In order to prevent the possibility of an overthrow or misplacement of the carrier at the end of the feed, the pawl $d$ is arranged to coöperate with a retaining device $e$, shown as an arm pivoted at $e^2$ and having a finger $e^3$ arranged to engage one of the notches $b^6$ at the end of each feed movement. The said finger $e^3$ is normally held in engagement with the surface of the disk $b^7$ by means of a spring $e^4$, shown as secured at one end to a pin $e^5$ upon the retaining member $b^{14}$ and at the other end to a pin $e^6$ upon the arm $e$. To disengage the said retaining device prior to each feed movement, the arm $e$ is arranged to be acted upon by a projection $d^{10}$ from the pawl $d$, so that in the rearward movement of said pawl the projection acting upon the arm $e$ will move the finger $e^3$ out of engagement with the notch $b^6$. In the feed movement, however, the said projection soon ceases to act upon the arm $e$, so that the finger $e^3$ is held against the surface of the disk $b^7$ ready to drop into one of the notches as soon as the notch comes in line with it.

In order to keep the feed-pawl and retaining device in proper adjustment, the pivotal connection of each is adjustably secured, the pawl $d$ being mounted on a stud $d^{20}$, which is engaged and supported by a screw $d^{21}$, whereby the said stud can be moved longitudinally along a slot $d^{22}$ to vary the position of the pawl with relation to the slide. Similarly, the pivotal connection $e^2$ of the arm $e$ is arranged to be adjusted by means of set-screws $e^{20}$.

In order that the feed movement of the carrier may take place after each operation of the tool, it is necessary that the supporting-anvil $a^{20}$ should be moved out of engagement with the shell prior to such feed movement. For this purpose the said anvil is mounted on a reciprocating anvil-carrier B, and the said anvil-carrier is arranged to move toward the tool $a$ as the said tool makes its operating-stroke. As herein shown, the said anvil-carrier B is mounted in vertical guides extending downward from the standard $C^2$ and is connected, by means of a pitman $B^2$, provided with an adjusting-screw $B^3$, to a wrist-pin $B^4$ upon a crank $B^5$, which is suitably connected with a rock-shaft $B^6$, having a suitable bearing in the downward projection, in which are formed the guides for the anvil-carrier. The said rock-shaft $B^6$ is provided with a crank $B^7$, to which is connected a rod $B^8$, adapted to be operated by the rotation of the main shaft $A^4$, the said rod being herein shown as provided with an eccentric-strap $B^9$, coöperating with an eccentric $B^{10}$, mounted on the said shaft $A^4$, the rotation of the eccentric producing an oscillating movement of the rock-shaft $B^6$. In the operation of the machine, therefore, the anvil and tool both reciprocate, the former entering the body of the shell to properly support the same and relieving the strain which would otherwise come on the flange and the latter moving in a direction to meet the said anvil and perform the necessary operation upon the shell supported thereon.

When, as will be hereinafter described, the machine is provided with a gang of tools—such as a punch, primer-inserting device, and finishing-tool—the anvils to coöperate with said tools are all mounted upon the same anvil-carrier B and all move into and out of operative position.

As will be seen from the foregoing description, the shells are continuously supplied to the carrier or shell-feeding device, uniformly arranged therein, and presented one by one to the primer-inserting tool. It is necessary, therefore, prior to each operation of the said inserting-tool to move a primer into line with the primer-seat, so that it will be engaged and pushed into place by the tool during the operative movement thereof. To this end the primer-feeding device comprises a hopper to contain a mass of primers and automatically deliver the same, a forwarding device to receive the primers from the hopper, and a transferring device arranged to receive one primer at a time from the forwarding device, move the said primer into position to be engaged by the inserting-tool, and hold the same there until it is engaged and operated upon by said tool.

The hopper $f$, which is adapted to contain a mass of the primers, is arranged to insure the delivery of the primers in a uniform position, whereby they will all be delivered to the forwarding device resting on the same end, so that when acted upon by the transferring device each primer will be properly positioned with relation to the shell. The primers P are commonly made cup-shaped and somewhat rounded at the closed end, and the hopper-openings which are along the lower edge of the hopper-wall are therefore shown as slightly contracted at their lower ends, so that the distance between said lower ends is a trifle less than the diameter of the primer, the main portion of the opening, however, being sufficiently large to permit a primer to pass through readily. It is obvious, therefore, that a primer which is resting on its open end cannot pass through, while one which is resting on its closed rounded end is not engaged by the lower contracted portion of the opening and will consequently pass through readily. The shape of the openings $f^2$ is best shown in Fig. 12, which is an elevation of a portion of the wall of the hopper, the position of the primer P with relation to said opening being illustrated in Figs. 10 and 11. In Fig. 10 the primer is shown as resting on its open end and engaged at its base or open end by the contracted sides of the opening $f^2$, and in order that the opening may be made large enough to allow the properly-positioned primers to pass through readily and at the same time to prevent improperly-positioned primers from passing through the same if forced upward over the contracted portion thereof each opening is preferably made somewhat larger than a primer, but is provided with a projection $f^3$ to engage the upper or closed portion of the primer and effectually prevent the same from escaping. If, on the contrary, a primer is resting on its closed end, as shown in Fig. 11, and on being agitated is to a certain extent tipped up, it is obvious that the projection $f^3$ will enter the open end of the primer, so that the said primer can readily work through the opening. By this construction the primers can be perfectly controlled, so as to insure the proper positioning thereof after they leave the hopper, and at the same time the openings may be made large enough to permit the primers to pass through readily, so that the forwarding device is amply supplied.

The hopper $f$ is shown as comprising a spider or frame rotatably mounted upon a spindle $f^4$, secured to an upward projection or bracket $f^5$, shown as fastened by a nut $f^6$ to the supporting-stud $g^2$ for the forwarding device $g$, which will be hereinafter more fully described. The said stud $g^2$ is shown as secured by a screw-thread to the base-plate C. The openings $f^2$ are shown as formed in a supplemental strip $f^7$, secured by screws $f^8$ to the inner wall of the spider and projecting downward toward the stationary floor $f^9$ of the hopper, which is clamped between a shoulder on the spindle $f^4$ and a portion of the bracket $f^5$.

To keep the primers agitated in the hopper, the said hopper is adapted to be rotated upon its spindle by means of a band $f^{10}$ coöperating with a suitable pulley on the main shaft $A^4$, as indicated in dotted lines, Fig. 1, the said band running in a suitable annular groove $f^{12}$ on the outside of the hopper and being directed by idler-pulleys $f^{13}$. As shown in Fig. 13, the floor $f^9$ of the hopper is surrounded by an inwardly-projecting flange $f^{14}$, the said flange being bent away so as to afford a passage $f^{15}$, into which the primers pass from the hopper. The said flange $f^{14}$ is shown as provided with an inwardly-projecting spring $f^{16}$, which is adapted to engage and clear away any primer which may be caught at one of the openings and carried around therein instead of properly escaping through into the passage $f^{15}$.

As herein shown and as has been already described, the shells are adapted to be carried forward in an inverted position with the primer-seat upward, and the reciprocating tool is arranged to make its effective stroke downward, so that it is necessary to have the primers presented with their open ends down. In the construction of the hopper shown the primers pass out uniformly positioned with their open ends up, and in order that they may all be inverted before being acted upon by the transferring device the passage or raceway is curved, so that the wall thereof which is adjacent to the floor of the hopper and at that point is the lower member eventually becomes the upper member, while a plate or strip $f^{17}$, parallel thereto, becomes the lower member, the said lower member terminating at a point adjacent to the surface of the forwarding device $g$. As herein shown, the said forwarding device $g$ comprises a continuously-traveling surface and is preferably in the shape of a disk mounted, as has been stated, to rotate upon the spindle $g^2$ and adapted to be thus rotated by means of a band $g^3$, guided by idler-pulleys $g^4$ and continuously driven by means of a suitable pulley upon the shaft $A^4$, as shown in dotted lines, Fig. 1.

Figures 3, 4, 5:
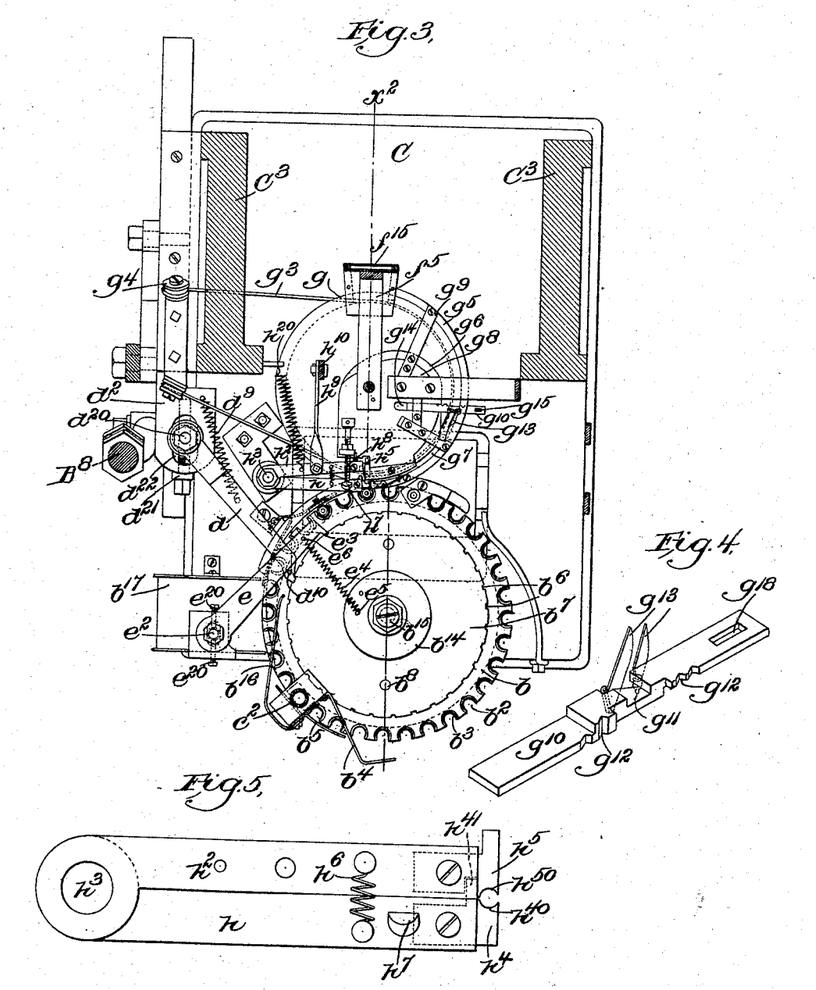
Fig. 3 is a horizontal section on the line $x^3$ of Fig. 2, but drawn on a slightly larger scale.
Fig. 4 is a detail in perspective of a portion of the primer-feed mechanism shown in Fig. 3.
Fig. 5 is a detail in plan of the transferring device.

Referring to Figs. 2 and 3, it will be seen that the primers passing downward through the passage $f^{15}$ are continuously delivered upon the surface of the disk $g$ and will be carried forward thereby as the said disk rotates. As the said primers are carried forward by the movement of the disk they will travel into the space between a stationary projection $g^5$ and a similar projection $g^6$, which, as shown in Fig. 3, constitute guides, the walls of which incline toward each other until they form a narrow passage $g^7$, capable of containing only a single line of primers. The projection $g^6$ is shown as consisting of the edge of the stationary plate $g^8$, which is secured to the under side of the hopper-supporting projection $f^5$, Fig. 2, just above the surface of the disk $g$. The flange portion $g^5$, which constitutes the other member of the passage, is secured to arms $g^9$, connected by screws with the upper side of the plate $g^8$, the thickness of said plate being sufficient to permit the primers to pass below the said arms. As shown in Fig. 2, the plate $g^8$ is supported on a shoulder formed at the top of the stud $g^2$, around which the disk $g$ rotates, the said plate lying close to, but not in contact with, the surface of the said disk. The said stud affords a support for the hopper-supporting projection $f^5$, which rests upon the plate $g^8$, the said plate thus holding the projection $f^5$ far enough above the surface of the disk $g$ to permit the primers to pass under the same.

Since the primers merely rest upon the surface of the disk $g$ by their own weight, it is obvious that when they are retarded by accumulating in the contracted passage the disk will simply travel along, sliding under the primers. To prevent all possible clogging in the passage and to insure that one primer at a time will enter the narrowest portion of the said passage, (hereinbefore referred to by the reference-letter $g^7$,) the said passage is provided with a controlling device $g^{10}$, comprising a reciprocating rod extending across between the guide-surfaces $g^5$ and $g^6$ at the point where they are separated from each other by a distance considerably greater than the diameter of the primer, and the said rod is provided with a passage $g^{11}$ (see Fig. 4) of sufficient width to admit one primer and one only. The said rod is arranged to be reciprocated back and forth across the passage and is provided with teeth or engaging portions $g^{12}$, which engage the primers pushed against the rod by the disk and tend to direct the same toward the passage $g^{11}$, it being obvious that as soon as one of the said primers comes into line with said passage with nothing in front to obstruct it it will be carried along into the said passage by the continuously-traveling disk upon which it rests.

The said controlling device $g^{10}$ is provided with a pair of wings $g^{13}$, pivotally connected with it and extending toward the contracted passage $g^7$ sufficiently far to substantially engage the walls thereof, thus guiding the primer which has entered directly into the said passage and preventing the possibility of clogging at the entrance which there would be if the whole mass of primers were allowed to accumulate therein.

The construction of the controlling device $g^{10}$ and the passage $g^{11}$ is best shown in Fig. 4, which is a perspective view of the under side of said controlling device as the said device would look if removed from its position as in Fig. 3 and turned laterally over.

The said controlling device $g^{10}$ is shown as longitudinally movable in a guide-passage $g^{14}$, formed in the plate $g^8$, and is arranged to be reciprocated across the entrance to the passage $g^7$ by means of a lever $g^{15}$, Figs. 2, 6, and 15, the said lever being pivoted at $g^{16}$ upon a lug $g^{17}$, secured to the frame of the machine. The said lever is arranged to enter and engage with a socket or opening $g^{18}$, Fig. 4, and is caused to swing at each reciprocation of the tool-carrier A by means of a projection $g^{19}$, secured to said tool-carrier and arranged to enter a slot $g^{20}$, Figs. 6 and 15, in the said lever, the said slot being inclined with relation to the direction of movement of the tool-carrier, so that as the said carrier moves up and down it will produce a lateral or swinging movement of the said lever, which in turn causes the reciprocating movement of the controlling device $g^{10}$.

It will be seen from the foregoing description that a number of primers are being continuously delivered to the forwarding device or disk $g$, the said primers having no definite arrangement, except that all are closed end up, which is the position in which they are to be transferred to the shell. The said mass of primers, however, is continuously carried or swept along, so to speak, by the continuously-rotating disk upon which they rest, so that they more or less completely fill the space between the guide-surfaces $g^5$ and $g^6$, the foremost primers then encountering the controlling device $g^{10}$. The said controlling device in its operation picks off one primer and admits it to the passage $g^7$, the traveling disk obviously carrying the primer along said passage so long as the passage is unobstructed. To transfer these primers to a position to be operated upon by the tool, therefore, it is necessary only to take them one at a time from the said passage, the vacancy left by the primer being immediately filled by those behind. To accomplish this, the machine is provided with a swinging member which constitutes the transferring device and is adapted to move transversely across the end of the passage $g^7$, receiving a primer therefrom and in its continued movement presenting said primer to a position between the shell and the primer-setting tool. The said transferring device or swinging member is herein shown as comprising a pair of arms $h\ h^2$, adapted to swing together upon a stationary pivotal support $h^3$, each arm, however, being pivoted independently of the other, so that the said arms are capable of being separated one from the other. The said arms thus constitute, as it were, a pair of nippers and are so situated that if their ends which are in line with the passage $g^7$ are separated a primer will escape from the said passage into the space between them and will be nipped or seized when the said arms come together and carried away when the said arms swing. As best shown in Fig. 5, the said arms are provided with nipper members $h^4$ and $h^5$, which have concave recesses $h^{40}$ and $h^{50}$, the said recesses forming when the two nipper-arms are together a substantially circular opening to fit and engage a primer. The arm $h$ is provided adjacent to the recess $h^{40}$ with a laterally-projecting portion $h^{41}$, and the said arm in the swinging movement of the device as a whole is arranged to be arrested with the said projecting surface $h^{41}$ at the mouth of the passage $g^7$, so that the foremost primer in said passage will be forced against the said projection and will be nipped between the nipper members when the two arms close together.

In order that the arms or the nipper members may open to receive the primer at the proper time, the said arms are yieldingly connected together, as by a spring $h^6$, and the swinging movement is directly imparted to one of the said arms, as $h^2$, and transmitted to the other through the agency of the said spring. In the swinging movement the arm which is yieldingly connected is adapted to be arrested before the swinging movement is completed, the other arm continuing to travel and being thereby separated from its mate.

As herein shown, the arm $h$ is provided with a stop $h^7$, arranged to be engaged by an adjustable projection $h^8$, shown as a screw supported in a suitable lug and provided with a check-nut to hold it stationary after the proper adjustment is made. The swinging movement being therefore directly imparted to the arm $h^2$, it is obvious that as soon as the stop $h^7$ is engaged by the projection $h^8$ the arm $h$ will be arrested, while the other arm, $h^2$, will continue its movement, overcoming the stress of the spring $h^6$ and separating the nipper members $h^4$ and $h^5$, so that a primer is free to enter the space between said members. In Fig. 3 the arms are shown separated, and the space between the nipper members $h^4$ and $h^5$ is directly in line with the primer-passage, so that the foremost primer will move into the said space until arrested by the projection $h^{41}$, and when the arm $h^2$ is moved in the opposite direction it will travel toward the said primer, the other member being held against the stop $h^7$ by the stress of the spring $h^6$ until the two members come together with the primer between the nipper members. The continued movement of the arm $h^2$ is then imparted to the arm $h$, both members, together with the primer between the nipper members, being bodily swung over the carrier, thus presenting the primer directly over the primer-seat in one of the shells ready to be acted upon by the primer-with a vent-passage $o^{21}$ to carry away the products of combustion in case of an explosion.

The machine, as hereinbefore described, is completely automatic, the only manual operation necessary being that of charging the shell-hopper and the primer-hopper, the former with shells headed and provided with primer-seats and the latter with the ordinary primers.

Upon starting the machine, which is accomplished by pressing down and latching the lever $i^3$, the shells are delivered to the shell-carrier, uniformly arranged therein, and forwarded to the gang of tools which operate to punch the primer-seats, set a primer in each seat, and then finish the shell by properly shaping the primer-seat. In the same operation the primers are delivered from the hopper, arranged in uniform position, and forwarded one at a time by the transferring device to a position between the inserting-tool and the primer-seat, so as to be inserted by said tool in the operative movement thereof. After each shell has been operated upon by the several tools it is advanced by the carrier until it is finally engaged by a clearing device $b^{16}$, which forces it out of the recess in the carrier, so that it drops into a delivery-chute $b^{17}$.

The said clearing device consists of a deflector which extends diagonally across the path of the recesses just above the carrier, so that a shell which projects above the surface of the carrier will be engaged by said deflector and moved laterally with relation to the carrier. The shells in the carrier, however, normally rest on their flanges at the bottoms of the recesses, the bodies of the shells projecting below the carrier, and in this position they are prevented from moving laterally out of the recesses by their flanges, which are larger in diameter than the lateral openings or mouths of the recesses. In order to eject them, therefore, the machine is provided with an inclined surface $b^{18}$ below the carrier and adjacent to the chute, the downwardly-projecting open ends of the shells riding up this inclined surface until the flanged ends project above the surface of the carrier, where they are engaged by the deflector $b^{16}$ and the whole shell thrust laterally out of its recess.

While the specific construction and arrangement of the various instrumentalities which combine to perform the functions heretofore described are practicable and in some instances in themselves novel, it is not intended to limit the invention to such specific construction and arrangement, since modifications may obviously be made without departing from the invention.

I claim—

1. A machine for inserting primers in cartridge-shells, comprising a traveling feeding device adapted to receive the shells from a hopper, means for uniformly arranging the said shells while in said feeding device, a primer-inserting tool, and means for presenting a primer to the said tool at each feed movement of the shell-feeding device, substantially as described.

2. A machine for inserting primers in cartridge-shells, comprising a traveling feeding device adapted to receive the shells from a hopper, means for uniformly arranging the said shells while in said feeding device, a primer-inserting tool, means for presenting a primer to the said tool at each feed movement of the shell-feeding device, and means for clearing or ejecting the shells from said feeding device after the primers have been inserted therein, substantially as described.

3. A machine for inserting primers in cartridge-shells comprising a traveling shell-feeding device or carrier adapted to receive the shells from the hopper and forward them to a position to be operated upon; means for uniformly arranging the shells while in said carrier; a primer-inserting tool; a primer-feeding device provided with means for automatically arranging the said primers in uniform position; and a transferring device for transferring one primer at a time to the said primer-inserting tool, substantially as described.

4. The combination with a shell-feeding device comprising a rotatable disk provided with recesses to receive inverted shells, each recess having a support for the flange of a shell, of intermittent feed mechanism for said disk, a reciprocating anvil to enter a shell in one of said recesses during the dwell between feed movements of said disk and support the same independently of the feeding device, and a reciprocating tool to operate upon the shell when supported by said anvil, substantially as described.

5. The combination with a shell-feeding device comprising a rotatable disk provided with recesses each adapted to receive a shell, of a hopper to contain a mass of shells, a guide or tube leading from said hopper toward said disk and adapted to deliver the shells endwise thereto, means for uniformly arranging the shells in said recesses during the rotation of the disk, feed mechanism for intermittingly rotating said disk, a reciprocating anvil to enter and support a shell in one of said recesses during the dwell between feed movements of the disk, and a reciprocating tool to operate upon the shell supported by said anvil, substantially as described.

6. The combination with the shell-feeding device comprising a rotatable disk provided with recesses having supports to receive the flanges of inverted shells, feed mechanism for intermittingly rotating said disk, a reciprocating anvil to enter a shell during the dwell between feed movements, a primer-feeding device to present a primer in line with the primer-seat in said shell, and a reciprocating finger to engage the said primer and insert the same in said primer-seat, substantially as described.

7. The combination with the shell-feeding device comprising a rotatable disk provided with recesses each having a support for the flange of an inverted shell, feed mechanism for intermittingly rotating said disk, a gang of reciprocating anvils to enter a number of shells in said recesses and support the same, and a gang of reciprocating tools to simultaneously operate upon the shells supported by said anvils, substantially as described.

8. The combination with the shell-feeding device adapted to receive and uniformly arrange the shells; of a primer-inserting tool; a reciprocating tool-carrier to operate said tool; means for automatically arranging the primers in uniform position; a primer transferring or feeding device operating after said primers are thus arranged to present one primer at a time to said tool; and connecting mechanism whereby said shell-feeding device, said primer-feeding device and said reciprocating tool-carrier are operated in the proper order, substantially as described.

9. The combination with the primer-inserting tool; of a reciprocating tool-carrier to operate said tool; means for arranging the primers in uniform position; a primer-feeding passage; a transferring device for transferring one primer at a time from said passage to said tool; and an actuating device for said primer-transferring device connected with and operated by said reciprocating tool-carrier, substantially as described.

10. A machine for setting primers in cartridge-shells comprising a shell-feeding device or carrier, a primer-feeding passage, a primer-inserting tool adapted to act upon a primer fed thereto and insert the same into the primer-seat of the shell presented by the shell-feeding device, an automatic throw-off adapted to stop the machine; and operating devices for said throw-off movable respectively toward the primer-feeding passage and the shell-carrier, substantially as described.

11. In a machine for priming cartridge-shells, the combination with the shell-feeding device, of a primer-inserting tool, a reciprocating tool-carrier for said tool, a primer-feeding device, and yielding feelers connected with and carried by said tool-carrier toward said feeding devices so as respectively to engage and be arrested by a primer in the primer-feed and a shell in the shell-feed, and an automatic throw-off adapted to be operated by either feeler when not so arrested and to thereby stop the machine, substantially as described.

12. The combination with the shell-feeding device, of a primer-feeding device, a reciprocating primer-inserting tool, and means for operating said feeding devices and said tool, a clutch to control said operating means, and feelers on said tool-carrier adapted to coöperate with said clutch, said feelers being movable respectively toward the shell-feeding device and the primer-feeding device.

13. The combination with a shell-feeding device, of a reciprocating tool for operating upon the shells therein, means for operating said feeding device and said tool, a clutch or throw-off controlling said operating means, a lever $i^3$ coöperating with said clutch, a catch to hold said lever, a pin $k^8$ adapted by its movement to throw the said lever off the catch, a yielding feeler to coöperate with said pin, and means for reciprocating said feeler toward and from a shell in the shell-feeding device, substantially as described.

14. In a machine for setting primers in cartridge-shells, the combination with a shell-feeding device, of a primer-feeding device, a reciprocating tool to engage a primer presented by the primer-feeding device and insert the same into a shell presented by the shell-feeding device, mechanism for operating said feeding devices and said tool, a clutch or throw-off controlling said operating mechanism, a lever $i^3$ coöperating with said clutch, a catch to hold said lever, a pin $k^8$ adapted to engage said lever and throw it off said catch, a pin $m^6$ also adapted to engage said lever and throw it off said catch, a yielding shell-feeler to coöperate with the pin $k^8$, a yielding primer-feeler to coöperate with the pin $m^6$, and means for reciprocating said feelers toward and from the shells and primers in their respective feeding devices, substantially as described.

15. In a machine for operating upon cartridge-shells, the combination with the shell-feeding device, of a reciprocating tool to operate upon the shells therein, common operating mechanism for said feeding device and said tool, a clutch or throw-off to control said operating mechanism, an arm or lever connected with said throw-off, a catch to hold said arm in the position to which it is moved to start the machine, a reciprocating feeler movable toward and from a shell in the carrier and adapted to be arrested thereby, and an engaging surface on said feeler adapted to cause a movement of said arm out of engagement with the said catch when said feeler travels its complete distance, substantially as described.

16. In a machine for setting primers in cartridge-shell, the combination with a shell-feeding device, of a primer-feeding device, a reciprocating tool to insert the primer into the primer-seat in the shell, operating mechanism for said feeding devices and said tool, a clutch or throw-off to control said operating mechanism, an arm or lever connected with said throw-off, a catch to hold said arm in the position to which it is moved to start the machine, a reciprocating feeler movable toward and from a primer in the primer-feeding device and adapted to be arrested thereby, and an engaging surface on said feeler adapted to cause a movement of said arm and throw it off of said catch when said feeler travels its complete distance, substantially as described.

17. In a machine for setting primers in cartridge-shells, the combination with a shell-feeding device, of a primer-feeding device, a reciprocating tool to insert the primer into the primer-seat in the shell, operating mechanism for said feeding devices and said tool, a clutch or throw-off to control said operating mechanism, an arm or lever connected with said throw-off, a catch to hold said arm in the position to which it is moved to start the machine, a reciprocating feeler movable toward and from a primer in the primer-feeding device and adapted to be arrested thereby, a similar feeler movable toward and from a shell in the shell-feed, and engaging surfaces on said feelers respectively, said engaging surfaces each being adapted to cause a movement of said arm and throw it off said catch when the feeler of which it forms a part travels its complete distance, substantially as described.

18. The combination with the shell-carrier, of a reciprocating primer-inserting tool, the primer-carrier, the guide-passage along which primers are advanced by said primer-carrier, and a transferring device comprising a pair of pivotally-supported arms adapted to be moved from said passage to the primer-inserting tool, means for separating said arms to receive the primer between the ends thereof, and means for bringing the said arms together prior to the movement thereof which transfers the primer from the said passage to the primer-inserting tool, and an actuating device for the said arms operating in response to the reciprocating movement of the inserting-tool, substantially as described.

19. The combination with the traveling primer-support, of the stationary guide-surfaces to guide the primers forwarded by said support, the passage for the said primers thus guided, the controlling device at the mouth of the said passage consisting of a reciprocating member having an opening therein and wings or guides extending from the opposite side of the said member to the walls of said passage, and the primer-transferring device at the opposite end of said passage, substantially as described.

20. In a machine for setting primers, the combination with a shell-feeding device, of a reciprocating finger movable toward and from a shell in said feeding device, a primer-feeding device comprising a pair of nippers pivotally supported and adapted to grip a primer and move the same into the path of said reciprocating finger whereby said primer is engaged by said finger and forced out from between said nippers into the primer-seat of the shell, and an actuator for said primer-feeding device movable in response to the movement of said reciprocating finger, substantially as described.

21. The combination with the shell-carrier comprising a traveling member having recesses each adapted to receive a shell, means for arranging the shells while in said carrier so that the open ends thereof all point in the same direction, a reciprocating tool to operate upon said shells, a reciprocating anvil to enter the mouth of a shell during the operation of the tool, and means for intermittingly moving the said carrier between consecutive operations of the tool and the anvil, substantially as described.

22. The combination with the carrier for the shells, of a hopper arranged to contain a mass of shells adapted to be fed by gravity toward said carrier, means for uniformly arranging the shells while in said carrier during the travel thereof, a primer-inserting tool adapted to reciprocate toward and from said carrier, a reciprocating anvil to engage the body of the shell during the reciprocation of said tool, and a primer-feeding device adapted to present a primer to said tool prior to the operative movement thereof, substantially as described.

23. In a machine for priming cartridge-shells the combination with a shell-feeding device comprising a carrier having an intermittent feed movement and adapted to receive shells from a hopper; of means for uniformly arranging the said shells while in said carrier; a reciprocating punch adapted to act upon the shell in said carrier to punch an opening in the primer-seat thereof; and a primer-inserting device adapted to insert a primer in said seat, substantially as described.

24. In a machine for priming cartridge-shells, the combination with a shell-feeding device comprising a carrier having an intermittent feed movement, a reciprocating punch adapted to act upon a shell in said carrier to punch an opening in the primer-seat thereof, a primer-inserting device adapted to insert a primer in the said seat, and a finishing-tool adapted to act upon the end of the shell to properly shape the primer-seat, substantially as described.

25. The herein-described punching device for cartridge-shells comprising a reciprocating anvil adapted to move into the body of the shell and to engage the under surface of the primer-seat, a reciprocating punch adapted to move toward said anvil and to enter an opening therein and thereby punch the primer-seat, and a stripping device loosely and yieldingly connected with said punch and adapted to enter the said primer-seat in advance thereof, and to remain in contact with the shell as the punch recedes, substantially as and for the purpose described.

26. The combination with a shell-feeding device comprising a carrier having an intermittent feed movement, of a reciprocating tool-carrier, a punch, a primer-inserting device and a finishing-tool carried by said tool-carrier, a reciprocating anvil for each tool, the said anvils being mounted on a common carrier and adapted to move toward the said tools in the reciprocation thereof to support the shells, and a primer-feeding device to present a primer to the primer-inserting tool, substantially as described.

27. The combination with a shell-feeding device provided with automatic arranging devices; of means for automatically arranging and feeding the primers; means for inserting a primer in the primer-seat of the shell; a yielding shell-feeler; a yielding primer-feeler; and an automatic throw-off adapted to be operated by said feelers, substantially as described.

28. In a machine for operating on cartridge-shells, the combination with a shell-feeding device having recesses provided with supports for inverted shells, of means for imparting a step-by-step movement to said feeding device, one or more reciprocating anvils adapted between feed movements to enter and support a shell or shells in said feeding device and to pass out of engagement with said shells prior to the next feed movement, and reciprocating tools to operate on the shells supported by said anvils, substantially as described.

29. In a machine for operating on cartridge-shells, the combination with a shell-feeding device having a step-by-step movement, of one or more reciprocating tools to operate on shells presented thereto by said feeding device, a main shaft provided with a crank and pitman to cause the reciprocation of said tools, reciprocating anvils to support the shells during the operation of said tools, a rock-shaft connected by a crank and pitman with said anvils to produce the reciprocation thereof, an eccentric on the main shaft, an arm provided with an eccentric, and a crank connected with said arm and with said rock-shaft, substantially as described.

30. A shell-carrier, comprising a traveling member provided with recesses having lateral openings the width of which is less than the diameter of the flange of the shell and greater than the diameter of the body of the shell; shoulders in said recesses to support the flange; means for supplying said recesses with cartridges either end up; and a deflecting device above the carrier to engage the upwardly-projecting body of a shell and tip the shell over in the recess, substantially as described.

31. A shell-carrier, comprising a traveling member provided with recesses having lateral openings the width of which is less than the diameter of the flange of the shell and greater than the diameter of the body of the shell; shoulders in said recesses to support the flange; the shoulders being so located that the body of a shell supported thereon open end down will project below the carrier; means for raising said body portion at a certain point in the travel of the carrier until the flange projects above the recess; and a clearing device to move the shell thus raised laterally out of the recess, substantially as described.

In testimony whereof I have signed my name to this specification in the presence of two subscribing witnesses.

PAUL BUTLER.

Witnesses:
   HENRY J. LIVERMORE,
   NANCY P. FORD.